US008107499B2

(12) United States Patent
Huang et al.

(10) Patent No.: US 8,107,499 B2
(45) Date of Patent: Jan. 31, 2012

(54) SPEED NEGOTIATION FOR MULTI-SPEED COMMUNICATION DEVICES

(75) Inventors: Wei-Jen Huang, Burlingame, CA (US); Chih-Tsung Huang, Burlingame, CA (US); Claudio DeSanti, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 1258 days.

(21) Appl. No.: 11/821,251

(22) Filed: Jun. 21, 2007

(65) Prior Publication Data

US 2008/0317069 A1 Dec. 25, 2008

(51) Int. Cl.
*H04L 3/06* (2006.01)
(52) U.S. Cl. ........ 370/503; 375/355; 375/356; 375/366; 370/510
(58) Field of Classification Search .................. 375/354, 375/355, 356, 366; 370/503, 507, 510; 709/227–229
See application file for complete search history.

(56) References Cited

U.S. PATENT DOCUMENTS

| 4,930,125 | A | * | 5/1990 | Bains | 370/510 |
|---|---|---|---|---|---|
| 5,471,474 | A | * | 11/1995 | Grobicki et al. | 370/437 |
| 5,634,006 | A | * | 5/1997 | Baugher et al. | 709/228 |
| 5,745,694 | A | * | 4/1998 | Egawa et al. | 709/225 |
| 5,878,039 | A | * | 3/1999 | Gorshe et al. | 370/376 |
| 5,936,859 | A | * | 8/1999 | Huang et al. | 375/354 |
| 6,084,931 | A | * | 7/2000 | Powell et al. | 375/355 |
| 6,351,487 | B1 | * | 2/2002 | Lu et al. | 375/225 |
| 6,760,346 | B1 | * | 7/2004 | Suemura et al. | 370/504 |
| 6,886,035 | B2 | * | 4/2005 | Wolff | 709/219 |
| 7,082,111 | B2 | * | 7/2006 | Amouris | 370/321 |
| 7,133,481 | B2 | * | 11/2006 | Azakami et al. | 375/355 |
| 7,174,090 | B2 | * | 2/2007 | Asamura et al. | 386/330 |
| 7,190,683 | B2 | * | 3/2007 | Giallorenzi et al. | 370/335 |
| 7,305,696 | B2 | * | 12/2007 | Thomas et al. | 725/114 |
| 7,564,872 | B1 | * | 7/2009 | Chawla et al. | 370/468 |
| 7,916,756 | B2 | * | 3/2011 | Atsumi et al. | 370/503 |
| 2001/0043613 | A1 | * | 11/2001 | Wibowo et al. | 370/468 |
| 2002/0178292 | A1 | * | 11/2002 | Mushkin et al. | 709/248 |
| 2003/0187934 | A1 | * | 10/2003 | Nishikawa et al. | 709/206 |
| 2004/0205206 | A1 | * | 10/2004 | Naik et al. | 709/230 |
| 2005/0100122 | A1 | * | 5/2005 | Hsu et al. | 375/354 |

(Continued)

OTHER PUBLICATIONS

IEEE 802.3-2005, "Information technology—telecommunications and information exchange between systems—local and metropolitan area networks—specific requirements—part 3: carrier sense multiple access with collision detection (CSMA/CD) access method and physical layer specifications".

(Continued)

*Primary Examiner* — David England
(74) *Attorney, Agent, or Firm* — Baker Botts L.L.P.

(57) ABSTRACT

A method includes defining a pattern of time intervals, each time interval having a respective assigned communication speed, which alternates among multiple communication speeds supported by a first communication device. Synchronization requests are transmitted over a communication medium from the first communication device to a second communication device at the respective communication speed that is assigned in each interval in accordance with the pattern. While transmitting the synchronization requests, synchronization replies sent over the communication medium in response to the synchronization requests are received only at the respective communication speed that is assigned in each interval. Responsively to receiving the synchronization replies from the second communication device, one or more common communication speeds that are supported by both the first and the second communication devices are identified. Communication is established between the first and second communication devices over the communication medium using one of the common communication speeds.

16 Claims, 1 Drawing Sheet

U.S. PATENT DOCUMENTS

| | | | |
|---|---|---|---|
| 2007/0116055 A1* | 5/2007 | Atsumi et al. | 370/476 |
| 2007/0274399 A1* | 11/2007 | Sakai et al. | 375/240.26 |
| 2008/0043704 A1* | 2/2008 | Geile | 370/342 |
| 2008/0168294 A1* | 7/2008 | Batson et al. | 713/400 |
| 2008/0189429 A1* | 8/2008 | DaCosta | 709/231 |
| 2008/0281968 A1* | 11/2008 | Rodriguez | 709/226 |
| 2008/0317069 A1* | 12/2008 | Huang et al. | 370/503 |

OTHER PUBLICATIONS

Clause 28 of the IEEE 802.3-2005, "Physical layer link signaling for 10 Mb/s, 100 Mb/s and 1000 Mb/s Auto-Negotiation on twisted pair".

Section 26 of the INCITS standard FC-FS-2, "Fibre channel framing and signaling 2", revision 1.01, Aug. 8, 2006.

* cited by examiner

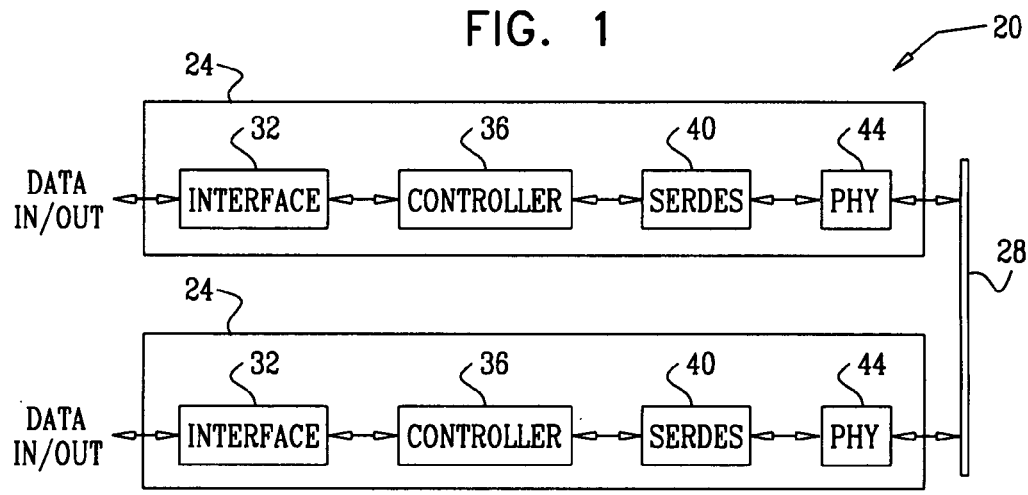
FIG. 1
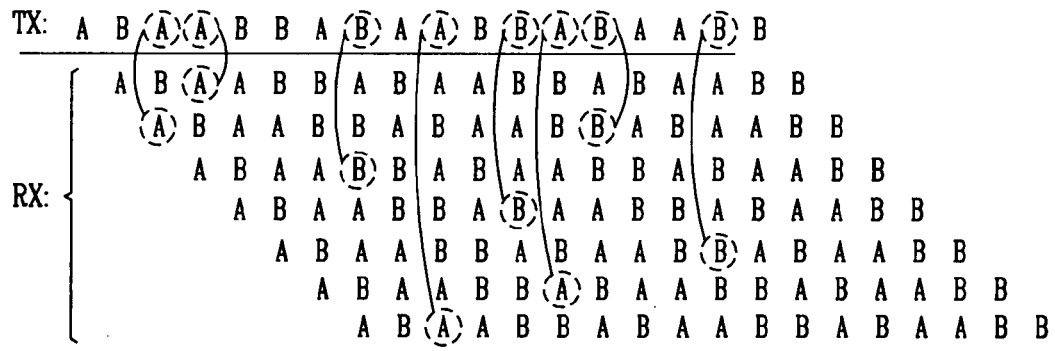
FIG. 2A
FIG. 2B
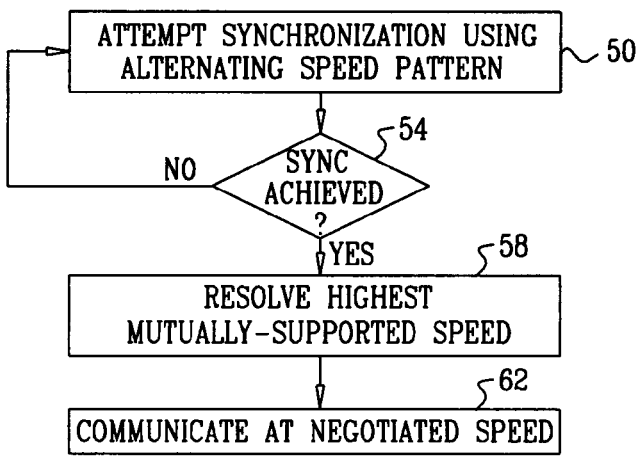
FIG. 3

SPEED NEGOTIATION FOR MULTI-SPEED COMMUNICATION DEVICES

FIELD OF THE INVENTION

The present invention relates generally to communication systems, and particularly to methods and systems for speed negotiation between communication devices.

BACKGROUND OF THE INVENTION

Communication devices sometimes use auto-negotiation methods when setting up communication links. Such methods are typically used to determine communication capabilities that are supported by both sides of the link, in order to agree on mutually-supported capabilities that may be used for communication. In particular, speed auto-negotiation methods are used to negotiate and resolve a communication speed at which the devices may communicate with one another.

Speed auto-negotiation methods in Ethernet™ links are described, for example, in the IEEE 802.3-2005 standard entitled "Information Technology—Telecommunications and Information Exchange between Systems—Local and Metropolitan Area Networks—Specific Requirements—Part 3: Carrier Sense Multiple Access with Collision Detection (CSMA/CD) Access Method and Physical Layer Specifications," which is incorporated herein by reference. Clause 28 of the standard describes auto-negotiation methods for physical layer link signaling over twisted-pair links for 10 Mbps, 100 Mbps and 1000 Mbps. Speed auto-negotiation is also defined for backplane Ethernet applications, in clause 73 of the emerging IEEE 802.3ap standard. Information regarding backplane Ethernet is available at grouper.ieee.org/groups/802/3/ap.

Speed negotiation is also sometimes used in Fibre Channel (FC) links. FC has been standardized by working group T11 of the International Committee for Information Technology Standards (INCITS), and FC standards are available at www.t11.org. Section 26 of INCITS Standard FC-FS-2, entitled "Fibre Channel Framing and Signaling 2," revision 1.01, Aug. 8, 2006, which is incorporated herein by reference, describes methods for speed negotiation in FC links.

The present invention will be more fully understood from the following detailed description of the embodiments thereof, taken together with the drawings in which:

BRIEF DESCRIPTION OF THE DRAWINGS

FIG. 1 is a block diagram that schematically illustrates a communication link, in accordance with an embodiment of the present invention;

FIGS. 2A and 2B are diagrams that schematically illustrate speed auto-negotiation transmission patterns, in accordance with an embodiment of the present invention; and FIG. 3 is a flow chart that schematically illustrates a method for speed auto-negotiation, in accordance with an embodiment of the present invention.

DESCRIPTION OF EXAMPLE EMBODIMENTS

Overview

Embodiments of the present invention provide improved methods and systems for automatic speed negotiation between communication devices, such as network element ports or network adapters. At least one device is assumed to comprise a multi-speed device, i.e., a device that supports two or more different communication speeds.

In some embodiments, setting up a communication link between two devices begins with each device alternating its transmission and reception in a predefined pattern of time intervals, which alternate among the different communication speeds supported by the device. During each time interval, which corresponds to a particular speed, the device transmits synchronization requests and attempts to receive corresponding synchronization responses. Initially, the alternating patterns of the two devices may have any arbitrary time offset with respect to one another. The devices may have the same pattern or different patterns, depending on the communication speeds supported by each device.

The alternating patterns used by the devices are designed to have overlapping time intervals of the same speed, regardless of the relative time offset between the patterns. This characteristic guarantees the existence of a time period in which the two devices will operate at the same speed, and will thus be able to synchronize with one another. Therefore, when using the alternating patterns described herein, the speed negotiation process is guaranteed to converge. Several exemplary patterns, as well as design principles for communication devices having any number of speeds, are described herein.

When synchronization is achieved, the two devices resolve the desired communication speed for the link. The resolved speed is often the highest speed that is supported by both devices. In some cases, the resolved speed also takes into account limitations imposed by the communication medium.

The automatic speed negotiation methods described herein reduce the likelihood of non-optimal or erroneous speed selection, which often occurs in manual speed configuration. Unlike some known speed auto-negotiation methods, in which all devices must support a low baseline common speed used for speed negotiation, the methods and systems described herein use the actual speeds used by the communication devices. Thus, high-speed devices need not support a common low speed just for the sake of speed negotiation.

Unlike other known speed auto-negotiation methods, in which the device transmits and receives at different speeds at the same time, the devices described herein transmit and receive at the same speed within each given time interval. Transmitting and receiving at the same speed enables considerable reduction in the complexity and cost of the device.

The methods and systems described herein can be used in various communication protocols and communication media, such as for Ethernet or Fibre Channel communication over wired media or over optical fiber links.

System Description

FIG. 1 is a block diagram that schematically illustrates a communication link 20, in accordance with an embodiment of the present invention. In link 20, two communication devices 24 communicate with one another in full duplex over a communication medium 28. Devices 24 may comprise Network Interface Cards (NIC), network adapters, network ports of network elements such as switches or routers, or any other devices that exchange data over suitable communication media. For example, devices 24 may comprise Host Bus Adapters (HBA) used in Fibre Channel systems, or Host Channel Adapters (HCA) or Target Channel Adapters (TCA) used in Infiniband® systems. Medium 28 may comprise an optical fiber, an electrical wire medium such as a twisted pair, coaxial cable or backplane traces, or any other suitable medium.

Devices 24 may communicate with one another over medium 28 using any suitable communication protocol. For example, devices 24 may exchange Ethernet™ frames in accordance with the IEEE 802.3 standard, cited above, over optical, wire or cable media. Alternatively, devices 24 may communicate using a Fibre Channel protocol, an Infiniband protocol, or any other suitable protocol.

Device 24 comprises a host interface 32, a Medium Access Control (MAC) controller 36, a serializer-deserializer (SERDES) 40 and a physical layer module (PHY) 44, which carry out bidirectional data transmission over medium 28. On transmission, interface 32 accepts data for transmission over the link. Controller 36 formats the data in data frames, in accordance with the communication protocol used. SERDES 40 converts the data produced by controller 36 to a stream of serial data bits. PHY 44 converts the bit stream produced by SERDES 40 to analog signals that are transmitted over medium 28. On reception, PHY 44 receives the analog signals transmitted over medium 28 and converts them into a serial bit stream. SERDES 40 converts the bit stream into parallel data. Controller 36 reconstructs the data frames and extracts the transmitted data. Host interface 32 outputs the data.

The configuration of device 24 shown in FIG. 1 is an exemplary configuration, which was chosen purely for the sake of conceptual clarity. Any other suitable device configuration can also be used. SERDES 40 and PHY 44 can be viewed collectively as a transceiver, which transmits and receives data over medium 28. In some embodiments, device 24 is implemented in an Application-Specific Integrated Circuit (ASIC). Some elements of device 24, and in particular controller 36, may alternatively be implemented in firmware or software. Additionally or alternatively, some of the elements of device 24 can be implemented using discrete devices. Further alternatively, the functions of device 24 can be integrated in a host system, such as in a network element. In some embodiments, PHY 44 comprises a Small Form-factor Pluggable (SFP) or SFP+ physical layer module, as are known in the art.

Speed Negotiation in Multi-Speed Devices

In some cases, devices 24 comprise multi-speed devices, i.e., devices that support multiple communication speeds. For example, devices for Ethernet communication over optical fiber links may support two or more communication speeds, such as 1 and 10 Gbps, 10 and 100 Gbps, 1, 10 and 100 Gbps, 10, 100 and 1000 Gbps, or any other desired combination of communication speeds. Some SFP+ devices, for example, are expected to support 1 and 10 Gbps speeds. Two devices 24 are able to communicate with one another if they have at least one common communication speed, i.e., a speed that is supported by both devices.

Embodiments of the present invention provide methods and systems for automatically negotiating a common communication speed between two devices 24, which are referred to herein as link partners. The negotiated speed is often the highest speed that is supported by both link partners. In some cases, the negotiated speed also takes into account limitations imposed by the communication medium.

In order to establish synchronization with the opposite link partner, each device 24 alternates its transmission and reception among the different communication speeds it supports, in accordance with a predefined transmission pattern. The pattern comprises a repetitive sequence of time intervals that alternate among the communication speeds supported by the device.

In each time interval, the device transmits synchronization requests (e.g., IDLE and/or configuration ordered sets, as defined in the IEEE 802.3 standard, or any other suitable type of synchronization words) at a single speed out of the set of supported speeds. The device attempts to receive synchronization responses from the other link partner. The device transmits and receives at the same speed within each time interval.

Initially, each of the two link partners attempts to achieve synchronization by transmitting and receiving synchronization requests in accordance with its respective transmission pattern. The transmission patterns used by the two link partners may be different, since each link partner may support a different set of communication speeds. Since there is no time synchronization between the link partners at this stage, the two transmission patterns may have an arbitrary time offset with respect to one another.

Thus, at any point in time, the two link partners may operate at the same communication speed or at different speeds, depending on the two transmission patterns and on the offset between them. Synchronization can be achieved when the two link partners operate at the same speed for a certain overlapping period of time, such that one of the link partners is able to receive a sufficient number of synchronization requests transmitted by the other link partner.

FIGS. 2A and 2B are diagrams that schematically illustrate exemplary transmission patterns, in accordance with an embodiment of the present invention.

FIG. 2A illustrates a situation in which one of the link partners is a single-speed device and the other link partner is a dual-speed device. One link partner, denoted L1, supports two communication speeds, in the present example 1 and 10 Gbps. The other link partner, denoted L2, supports only 1 Gbps.

Device L1 operates (i.e., transmits and receives) in accordance with a transmission pattern that alternates between 1 Gbps and 10 Gbps. The pattern comprises two types of time intervals, denoted A and B. The device operates at 1 Gbps during the intervals denoted A, and at 10 Gbps during the intervals denoted B. Typically but not necessarily, time intervals A and B have the same length. The pattern comprises a sequence of six time intervals that follow the order [A B A A B B], which is repeated continuously. Device L2 operates constantly at its single 1 Gbps speed, in a sequence of time intervals of type A. Synchronization can be established when the two transmission patterns have overlapping time intervals having the same speed, such as the interval marked in the figure.

FIG. 2B illustrates a situation in which both devices L1 and L2 are dual-speed devices. In the present example, both devices support 1 Gbps and 10 Gbps and use the same repetitive [A B A A B B] transmission pattern. The figure shows the different possible time offsets between devices L1 and L2. As can be seen in the figure, the two transmission patterns have overlapping time intervals having the same speed, regardless of the arbitrary offset between the patterns. Thus, devices L1 and L2 can achieve synchronization regardless of the time offset between them. Typically, the pattern also enables the two link partners to synchronize at the highest common speed that is reliably transported by the communication medium, regardless of the time offset.

The repetitive [A B A A B B] transmission pattern is characterized in that two replicas of this pattern will always have overlapping time intervals of the same speed, regardless of the time offset between the replicas. The [A B A A B B] pattern is believed to be the shortest pattern having this characteristic. It is often advantageous to use shorter patterns, since they provide a shorter synchronization time and reduced complexity. In alternative embodiments, however, any other suitable pattern can also be used.

The length of the time intervals in the pattern depends on a number of factors, such as:

- The number of synchronization words (e.g., IDLE or configuration ordered sets), whose reception is considered sufficient for declaring successful synchronization. In the embodiments described herein, successful reception of 1000 synchronization words is considered sufficient, although any other suitable number can be used. The time interval size should allow for a sufficient number of synchronization words at the lowest supported speed.
- The cumulative worst-case re-locking times of SERDES 40 at the two link partners.
- The worst-case response time of controller 36.
- The maximum expected latency of medium 28.
- The maximum expected time jitter and other timing errors in the two link partners.

Typically but not necessarily, the lengths of the time intervals are selected to be large with respect to the length of the synchronization words used by the communication protocol. For example, four thousand 8B/10B GBE symbols occupy four microseconds. A typical transmission interval that can be used in this case can be several milliseconds in length, and up to an order of 100 milliseconds. Alternatively, any other suitable length can also be used.

In some embodiments, each time interval begins with a switching guard time, during which device 24 switches and settles at the desired communication speed. Typically, no synchronization attempts are transmitted during this period. The length of the switching guard time is usually defined based on the switching speed of device 24, and in particular the switching speed of Phase-Locked Loop (PLL) circuitry in SERDES 40. A typical length can be on the order of one millisecond, although other values can also be used. The switching guard time is followed by an active period, in which the device transmits synchronization attempts and monitors for synchronization replies. In order to enable sufficient overlap in various time offsets between the link partners, the length of the active period is usually selected to be larger than the switching guard time, e.g., several milliseconds long. In some embodiments, the active period length is selected so that the link partners are likely to have two synchronization opportunities (overlap periods), one before the switching guard time and one following it.

Device 24 may use different conditions or criteria to determine when successful synchronization occurs. The conditions typically differ from one communication protocol to another and from one speed to another. For example, in IEEE 802.3 Ethernet links, synchronization may be declared when the Physical Coding Sublayer (PCS) of the receiving link partner is active and functional for 1000 transmission words. In 1000Base-X operation, synchronization can be indicated by comma alignment and error-free symbol decoding. For 10GBase-X, synchronization can be indicated by comma alignment, lane deskewing and error-free symbol decoding. In 10GBase-R operation, synchronization can be indicated by 66B frame synchronization and error-free symbol decoding. In 10GBase-W, synchronization can be indicated by detecting A1 to A2 transitions in the Wide Area Network Interface Sublayer (WIS).

As noted above, device 24 transmits and receives at the same speed within a given time interval. This property is in contrast to some known speed negotiation methods, in which the device transmits at one speed and receives at another speed simultaneously. Transmitting and receiving at the same speed enables considerable reduction of the complexity and cost of the device. For example, some of the circuitry of SERDES 40, such as Phase-Locked Loops (PLLs) or other clock and timing generation circuitry, can be shared between its transmission and reception circuits. The reduction in complexity is particularly significant in communication protocols, in which the encoded data rates of different speeds have no harmonic relationship with one another. For example, 1000BASE-X Gigabit Ethernet uses a 1.25 Gbps encoded data rate, while 10GBASE-R 10 Gigabit Ethernet has a 10.3125 Gbps encoded data rate.

FIG. 3 is a flow chart that schematically illustrates a method for speed auto-negotiation, which is carried out by multi-speed communication device 24, in accordance with an embodiment of the present invention. The method begins with device 24 performing synchronization attempts using an alternating speed transmission pattern, at a pattern operation step 50. In each interval, the device transmits synchronization requests at a certain speed and attempts to receive corresponding synchronization responses.

The device checks whether synchronization is achieved in the current time interval, at a synchronization checking step 54. If synchronization is not achieved, the method loops back to step 50 above, and device 24 continues to transmit and receive using the alternating pattern.

In some cases, the two link partners may have more than one common speed. The devices typically attempt to communicate at the highest speed that is supported by both of them. The speed in which synchronization is achieved at step 50 above may be any of the common speeds, not necessarily the highest speed.

Thus, when device 24 detects that synchronization is achieved, it resolves the highest communication speed that is supported by both link partners, at a speed resolution step 58. In some embodiments, the two link partners stop using the alternating pattern and establish communication at the arbitrary speed in which synchronization was initially achieved. Then, the devices use a suitable messaging protocol to resolve the highest mutually-supported speed.

In alternative embodiments, the two link partners continue to operate using their alternating patterns and wait for additional successful synchronization events. After a certain number of successful synchronization events, or after a predetermined time period, each device selects the highest detected common speeds and uses the respective synchronization event for establishing communication. Converging to the multiple common speeds can be advantageous for maintaining backward compatibility with legacy devices, since the selection as to which communication speed to assign to each time interval type in the pattern can be arbitrary. For example, the A intervals can be arbitrarily assigned to 1 Gbps and the B intervals assigned to 10 Gbps in dual-speed devices. For devices that support 100 Gbps, the A slots can be reused for 100 Gbps and the B slots maintained at 10 Gbps. This allocation maintains interoperability across the different device types. Similarly, the B slots can be used for 1000 Gbps.

In some embodiments, devices 24 consider the conditions of medium 28 when negotiating the desired communication speed. For example, in some cases the medium may be too noisy to enable reliable communication at the highest mutually-supported speed. In these cases, the devices may negotiate a lower mutually-supported speed. The two link partners communicate at the negotiated speed, at a communication step 62.

Triple-Speed Patterns and Interoperability Considerations

In some embodiments, device 24 supports more than two communication speeds. In such embodiments, the principles described hereinabove can be used to produce patterns that alternate among any number of communication speeds. For example, when device 24 supports 1, 10 and 100 Gbps, a triple-speed pattern of the form [A B C A A A B C B B B A C C] can be used, wherein A denotes time intervals in which the device operates at 1 Gbps, B denotes 10 Gbps intervals and C denotes 100 Gbps intervals.

Similarly to the dual-speed [A B A A B B] pattern described above, the triple-speed [A B C A A A B C B B B A C C C] pattern is also constructed such that two replicas of the pattern have overlapping time intervals of all three speeds, irrespective of the relative time offset between the replicas. Thus, link partners that use this pattern can carry out a synchronization process that converges to all common speeds and resolves the highest common speed that is reliably transported by the communication medium.

The triple-speed pattern described above enables the triple-speed device to synchronize with other triple-speed devices, with dual-speed 1/10 Gbps devices that use the [A B A A B B] pattern, as well as with dual-speed 10/100 Gbps devices that use a [C B C C B B] pattern. This extension principle can be used to produce mutually-compatible transmission patterns for any subset within a set of possible communication speeds.

In alternative embodiments, other (possibly shorter) triple-speed patterns can also be used, although these patterns may overlap in only some of the common speeds at a given time offset. In these cases, the link partners typically negotiate the highest common speed using a messaging protocol. The messaging protocol can also be advantageous as an additional confirmation means as to the highest common speed, or for interoperability reasons, e.g., when new patterns are being introduced.

When a communication device supports only two speeds, the device can use a modified version of the triple-speed pattern described above, in which the time intervals that were originally allocated to the third (unsupported) speed are redistributed for use by the two supported speeds. This configuration typically reduces the synchronization time. FIG. 2A above illustrates this situation for the single-speed case.

Although the embodiments described herein mainly address speed negotiation between multi-speed communication devices, the principles of the present invention can also be used for additional applications, such as for communication with memory and/or peripheral Input/Output (I/O) devices.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for negotiating communication speed between a first communication device and a second communication device communicating over a communication medium according to a physical layer protocol, the method comprising:

defining a pattern of time intervals, each time interval having a respective assigned physical layer protocol communication speed, which alternates among multiple physical layer protocol communication speeds supported by the first communication device, wherein the pattern is defined such that first and second replicas of the pattern have at least one overlapping time interval of the same physical layer protocol communication speed for any arbitrary time offset between the first and second replicas;

transmitting synchronization requests over the communication medium from the first communication device to the second communication device at the respective physical layer protocol communication speed that is assigned in each interval in accordance with the pattern;

while transmitting the synchronization requests, attempting to receive synchronization replies sent over the communication medium to the first communication device in response to the synchronization requests only at the respective physical layer protocol communication speed that is assigned in each interval in accordance with the pattern;

responsively to receiving the synchronization replies from the second communication device, identifying one or more common physical layer protocol communication speeds that are supported by both the first and the second communication devices; and establishing communication between the first and second communication devices over the communication medium according to the physical layer protocol using one of the common physical layer protocol communication speeds.

2. The method according to claim 1, wherein the pattern is defined such that the first and second replicas have at least one overlapping time interval of each of the physical layer protocol communication speeds supported by the first communication device.

3. The method according to claim 1, wherein the first communication device supports at least first and second physical layer protocol communication speeds, and wherein the pattern comprises a sequence of six successive time intervals, of which the first, third and fourth time intervals are assigned the first physical layer protocol communication speed and the second, fifth and sixth time intervals are assigned the second physical layer protocol communication speed.

4. The method according to claim 1, wherein the communication medium comprises an optical fiber link and the physical layer protocol is according to a Fibre Channel (FC) standard.

5. The method according to claim 1, wherein the communication medium comprises an electrical wire medium.

6. The method according to claim 1, wherein identifying the one or more common communication speeds comprises communicating between the first and second communication devices using the physical layer protocol communication speed at which the synchronization replies were received.

7. The method according to claim 1, wherein identifying the one or more common physical layer protocol communication speeds comprises continuing to transmit and receive in accordance with the pattern, and attempting to receive the synchronization replies at the one or more common physical layer protocol communication speeds.

8. The method according to claim 1, wherein transmitting the synchronization requests and attempting to receive the synchronization replies comprise transmitting and receiving simultaneously using a common clock generation circuit.

9. A communication device for communicating over a communication medium according to a physical layer protocol, comprising:

a transceiver, which is arranged:

to transmit synchronization requests over the communication medium according to the physical layer protocol and in accordance with a predefined pattern of time intervals, each time interval having a respective assigned physical layer protocol communication speed that alternates among multiple physical layer protocol communication speeds supported by the communication device, wherein the pattern is defined such that first and second replicas of the pattern have at least one overlapping time interval of the same physical layer protocol communication speed for any arbitrary time offset between the first and second replicas; and to attempt to receive synchronization replies sent to the communication device from a remote communication device in response to the synchronization requests only at the respective physical layer protocol communication speed that is assigned in each interval in accordance with the pattern; and a controller, which is arranged, responsively to receiving the synchronization replies from a remote communication device:

to identify one or more common physical layer protocol communication speeds that are supported by both the communication device and the remote communication device, and to establish communication with the remote communication device over the communication medium according to the physical layer protocol using one of the physical layer protocol common communication speeds.

10. The device according to claim 9, wherein the pattern is defined such that the first and second replicas have at least one overlapping time interval of each of the physical layer protocol communication speeds supported by the device.

11. The device according to claim 9, wherein the pattern comprises a sequence of six successive time intervals, of which the first, third and fourth time intervals are assigned a first physical layer protocol communication speed and the second, fifth and sixth time intervals are assigned a second physical layer protocol communication speed.

12. The device according to claim 9, wherein the communication medium comprises an optical fiber link, and wherein the transceiver comprises an optical transceiver and the physical layer protocol is according to a Fibre Channel (FC) standard.

13. The device according to claim 9, wherein the communication medium comprises an electrical wire medium, and wherein the transceiver comprises a wireline transceiver.

14. The device according to claim 9, wherein the controller is arranged to identify the one or more common physical layer protocol communication speeds by communicating with the remote communication device using the physical layer protocol communication speed at which the synchronization replies were received.

15. The device according to claim 9, wherein the controller is arranged to identify the one or more common physical layer protocol communication speeds by continuing to transmit and receive in accordance with the pattern, and attempting to receive the synchronization replies at the one or more common physical layer protocol communication speeds.

16. The device according to claim 9, wherein the transceiver comprises a clock generation circuit, which is arranged to produce a common clock signal for transmitting the synchronization requests and for attempting to receive the synchronization replies.

* * * * *